United States Patent
Cyr

[15] 3,677,574
[45] July 18, 1972

[54] MEANS FOR ADJUSTING HEIGHTS OF CUT IN POWER MOWER

[72] Inventor: Lawrence Cyr, Rte. No. 3, Noblesville, Ind. 46060

[22] Filed: Oct. 9, 1970

[21] Appl. No.: 79,421

[52] U.S. Cl. ................................................. 280/43.13
[51] Int. Cl. ................................................. B62d 21/18
[58] Field of Search ........................... 280/43, 13, 43.17

[56] References Cited

UNITED STATES PATENTS

| | | | |
|---|---|---|---|
| 3,357,715 | 12/1967 | Plamper | 280/43.13 |
| 3,544,127 | 12/1970 | Dobson | 280/43.17 |
| 2,730,374 | 1/1956 | Rogers | 280/43.13 |
| 2,986,402 | 5/1961 | Winton | 280/43.13 |
| 3,292,351 | 12/1966 | Larson | 280/43.13 |

Primary Examiner—Benjamin Hersh
Assistant Examiner—Robert R. Song
Attorney—Berman, Davidson and Berman

[57] ABSTRACT

A power lawn mower having a frame supported on a pair of rotatable spaced transverse shafts provided at their ends with crank arms on which supporting wheels are journaled. The shafts are linked together and one of the shafts is provided with a control lever having a dog engagable with a notched sector member on the frame to lock the mower at an adjusted cutting height.

5 Claims, 3 Drawing Figures

Patented July 18, 1972

3,677,574

LAWRENCE CYR,
BY
Berman, Davidson & Berman,
ATTORNEYS.

MEANS FOR ADJUSTING HEIGHTS OF CUT IN POWER MOWER

This invention relates to power lawn mowers, and more particularly to a power lawn mower provided with means for adjusting the cutting height of the mower.

A main object of the invention is to provide a novel and improved power lawn mower having a cutting height-adjusting means, the device being simple in construction, being reliable in operation, and involving a minimum number of parts.

A further object of the invention is to provide an improved cutting height-adjusting means for a power lawn mower, said adjusting means involving relatively inexpensive components, being easy to manipulate, being positive in action, and having an operating handle which is easily accessible to the user of the lawn mower so that the cutting height of the lawn mower can be readily adjusted whenever desired, for example, in the process of cutting a lawn.

A still further object of the invention is to provide an improved supporting structure for the frame of a power lawn mower and said supporting structure including axle means on which the lawn mower supporting means are journaled, said axle means being provided with a simple and effective arrangement for varying the cutting height of the lawn mower.

Further objects and advantages of the invention will become apparent from the following description and claims, and from the accompanying drawings, wherein:

Figures 1, 2, 3:
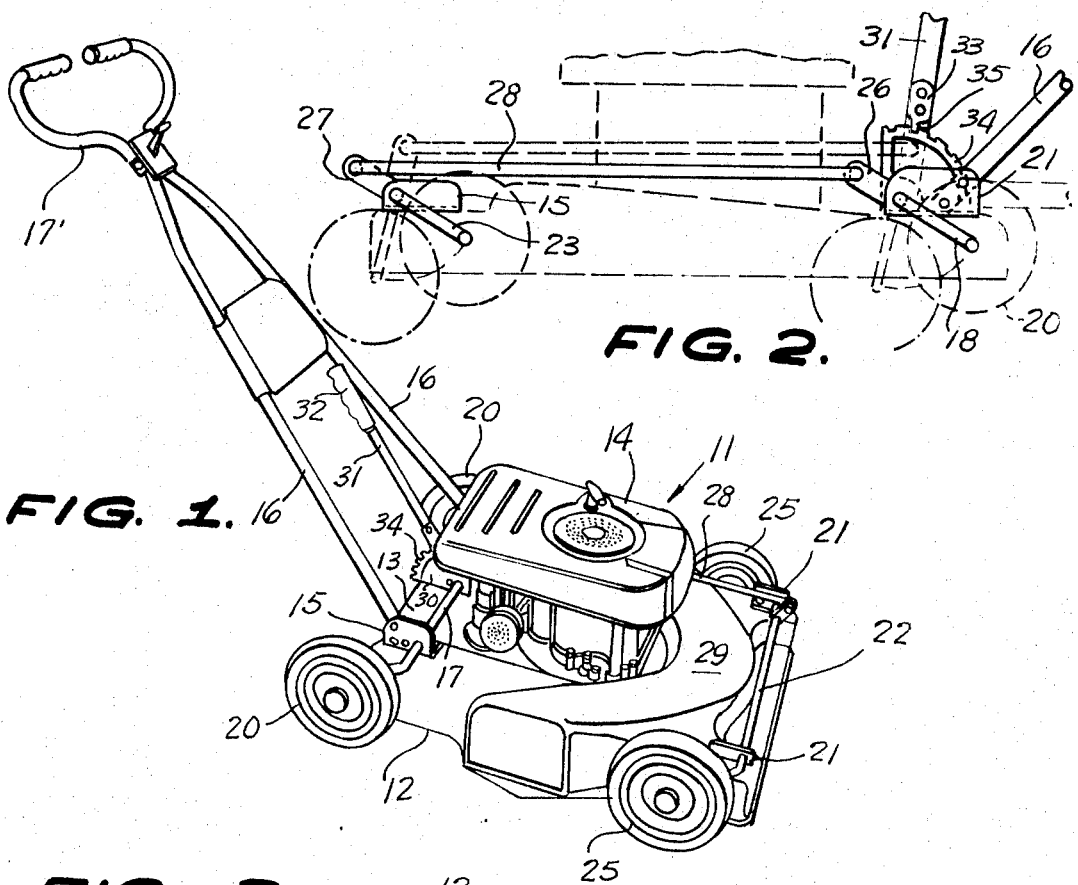
FIG. 1 is a perspective view of a power lawn mower provided with an improved cutting height-adjusting means in accordance with the present invention.
FIG. 2 is a side elevational view of the cutting height-adjusting means employed in the power lawn mower of FIG. 1, the lawn mower being shown in dotted view and in a fragmentary manner.
FIG. 3 is a top plan view of the lawn mower cutting height-adjusting structure shown in FIG. 2.

Referring to the drawings, 11 generally designates a power lawn mower provided with improved cutting height-adjusting means in accordance with the present invention. The power lawn mower 11 comprises a main supporting frame 12 which may be formed from sheet metal, which may be formed as a casting, or which may be fabricated in any other suitable manner, the frame 12 having a top deck 13 on which a lawn mower driving motor 14 is mounted in a conventional manner. The frame 12 is of downwardly concave shape and the usual rotary cutting blade is housed beneath the frame, said blade being secured to the depending vertical output shaft of the driving motor 14.

Mounted on the rear corner portions of the frame 12 are respective longitudinally extending angle brackets 15, 15 to the rear portions of which are secured the upwardly convergent side arms 16,16 of a conventional steering handle structure 17', which thus is inclined upwardly and rearwardly from the main supporting frame 12.

Rotatably mounted in the upstanding flanges of the longitudinally extending angle brackets 15,15 is the rear transverse shaft 17 which is formed at its outer ends with parallel crank arms 18,18, said crank arms being provided at their ends with outwardly projecting transverse stub shafts 19,19 on which are journaled respective supporting wheels 20,20.

Rigidly secured on the front corner portions of the main supporting frame 12 are longitudinally extending angle brackets 21,21 having upstanding flanges in which is journaled a front transverse shaft 22 provided at its ends with parallel crank arms 23,23, said crank arms being formed with outwardly projecting stub shafts 24,24 on which are journaled respective front supporting wheels 25,25.

Rigidly secured to the transverse shafts 17 and 22 are respective control arms 26 and 27 which are connected together by a link rod 28 which extends parallel to the top deck 13 of frame 12 and which is spaced thereabove, as shown in FIG. 1. Furthermore, as shown in FIG. 1, the link bar 28 is spaced a substantial distance above a laterally discharging outlet duct 29 formed integrally with the frame 12. As shown in FIG. 2, the arms 26 and 27 may extend diametrically opposite to the associated crank arms 18 and 23.

Rigidly secured on the intermediate portion of the rear margin of top deck 13 is an upstanding longitudinally extending sector plate member 30 which rotatably and concentrically receives the rear transverse shaft 17. Rigidly secured to shaft 17 adjacent to plate 30 is a flexible hand lever 31 which extends upwardly and rearwardly and which is provided at its top end with a rubber hand grip 32. Secured to the lower portion of lever 31 is an offset dog 33 which is rockably engageable with a notched peripheral flange 34 provided on the sector plate member 30. Thus, the dog member 33 includes a rocking bar element 35 which extends parallel to the lever 31 and which is spaced laterally therefrom, the bar element 35 being selectively engageable in the notches of flange 34 to lock shaft 17 at a selected angle of rotation relative to the arcuate sector member 30. This correspondingly adjusts the angle of inclination of the crank arms 18 and 23 and thereby adjusts the cutting height of the lawn mower.

The locking bar element 35 of dog 33 is normally seated in one of the notches of the peripheral flange 34 of the sector olate member 30, but may be disengaged therefrom by flexing the lever 31 in a counter-clockwise direction, as viewed in FIG. 3, whereby to allow the lever to be rotated and to engage the locking bar element 35 in a different notch, for varying the mower cutting height.

As shown in FIG. 1, the height-adjusting lever 31 is located substantially between the side arms 16,16 of the steering handle structure 17', whereby the hand grip 32 is readily accessible by the operator of the mower, and whereby the operator can easily adjust the cutting height of the mower at any time, for example, during the process of mowing. Thus, it will be seen that the lever 31 may be employed to simultaneously rotate the transverse shafts 17 and 22, to either raise or lower the frame 12 with respect to the ground, whereby to select a desired cutting height.

While a specific embodiment of an improved cutting height-adjusting structure for a power lawn mower has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a power mower, a supporting frame, a pair of spaced transverse shafts rotatably connected to said frame, crank arms on the ends of said shafts, respective supporting wheels journaled to the ends of the crank arms, means to lock the transverse shafts in different rotated positions, whereby to adjust the cutting height of the power mower, and link means interconnecting said transverse shafts, wherein said link means comprises respective control arms connected to said transverse shafts and a link bar connecting said control arms, wherein one of said transverse shafts is provided with an upstanding control lever rigidly secured thereto, wherein the means to lock the transverse shafts is adjusted rotated position comprises interengageable locking means on said control lever and said frame, and wherein said locking means comprises a dog element on the lever and a notched sector member on the frame coaxial with said one of the said transverse shafts and being lockingly engageable by said dog element.

2. The power mower of claim 1, and wherein said sector member has a peripheral flange formed with spaced notches, said dog element being selectively engagable with said notches.

3. The power mower of claim 2, and wherein said control lever is laterally flexible to allow said dog element to be at times disengaged from said notches.

4. The power mower of claim 3, and wherein said control lever is located at the rear portion of said frame.

5. The power mower of claim 4, and wherein said power mower is provided with a steering handle projecting upwardly and rearwardly from the rear end portion of said frame, said control lever being located adjacent said steering handle.

* * * * *